United States Patent
Waters et al.

(10) Patent No.: US 7,461,736 B2
(45) Date of Patent: *Dec. 9, 2008

(54) METHOD FOR FORMING A MULTIPLE DUROMETER CONVEYOR BELT CLEANER SCRAPER BLADE

(75) Inventors: Andrew J. Waters, Kawanee, IL (US); Mark Strebel, Chillicothe, IL (US); Brian Kaiser, Buda, IL (US)

(73) Assignee: Martin Engineering Company, Neponset, IL (US)

( * ) Notice: Subject to any disclaimer, the term of this patent is extended or adjusted under 35 U.S.C. 154(b) by 488 days.

This patent is subject to a terminal disclaimer.

(21) Appl. No.: 11/317,377

(22) Filed: Dec. 23, 2005

(65) Prior Publication Data

US 2006/0131135 A1   Jun. 22, 2006

Related U.S. Application Data

(63) Continuation-in-part of application No. 10/901,652, filed on Jul. 29, 2004, now Pat. No. 7,007,794.

(51) Int. Cl.
*B65G 45/00* (2006.01)

(52) U.S. Cl. ..................................... 198/497
(58) Field of Classification Search .......... 198/497–499
See application file for complete search history.

(56) References Cited

U.S. PATENT DOCUMENTS

| | | |
|---|---|---|
| 4,257,517 A | 3/1981 | MacPherson et al. |
| 4,328,888 A | 5/1982 | Luke |
| 4,825,996 A | 5/1989 | Davidts |
| 4,962,845 A | 10/1990 | Gibbs |
| 4,978,999 A | 12/1990 | Frankel et al. |
| 5,007,523 A | 4/1991 | Morefield |
| 5,628,392 A | 5/1997 | Stoll et al. |
| 5,797,477 A | 8/1998 | Veenhof |
| 6,401,911 B1 | 6/2002 | Swinderman |
| 6,419,073 B1 | 7/2002 | Piron |
| 6,619,469 B2 | 9/2003 | Malmberg |
| 6,695,123 B2 | 2/2004 | Stoll |
| 7,308,980 B2 * | 12/2007 | Peterson et al. ............. 198/617 |
| 7,370,750 B2 * | 5/2008 | Swinderman ............... 198/497 |
| 2002/0125106 A1 | 9/2002 | Hall |
| 2003/0066737 A1 | 4/2003 | Malmberg |
| 2003/0116405 A1 | 6/2003 | Stoll |

FOREIGN PATENT DOCUMENTS

WO       WO 03/035518         5/2003

* cited by examiner

*Primary Examiner*—Mark A Deuble
(74) *Attorney, Agent, or Firm*—Thompson Coburn LLP

(57) ABSTRACT

A method for forming a one-piece integral multi-durometer scraper blade for a conveyor belt cleaner. The scraper blade includes a body extending longitudinally between a first end and a second end and extending transversely between a base and a tip. The body includes a first body portion comprising a first elastomeric material having a first durometer of hardness, and a second body portion comprising a second elastomeric material having a second durometer of hardness.

16 Claims, 3 Drawing Sheets

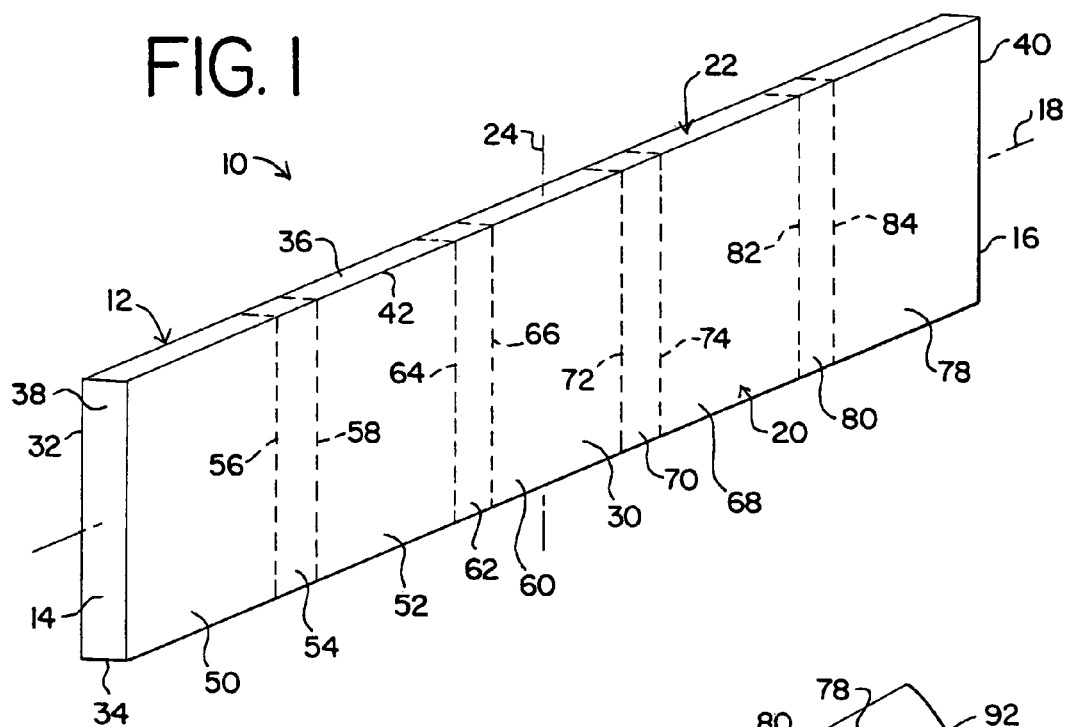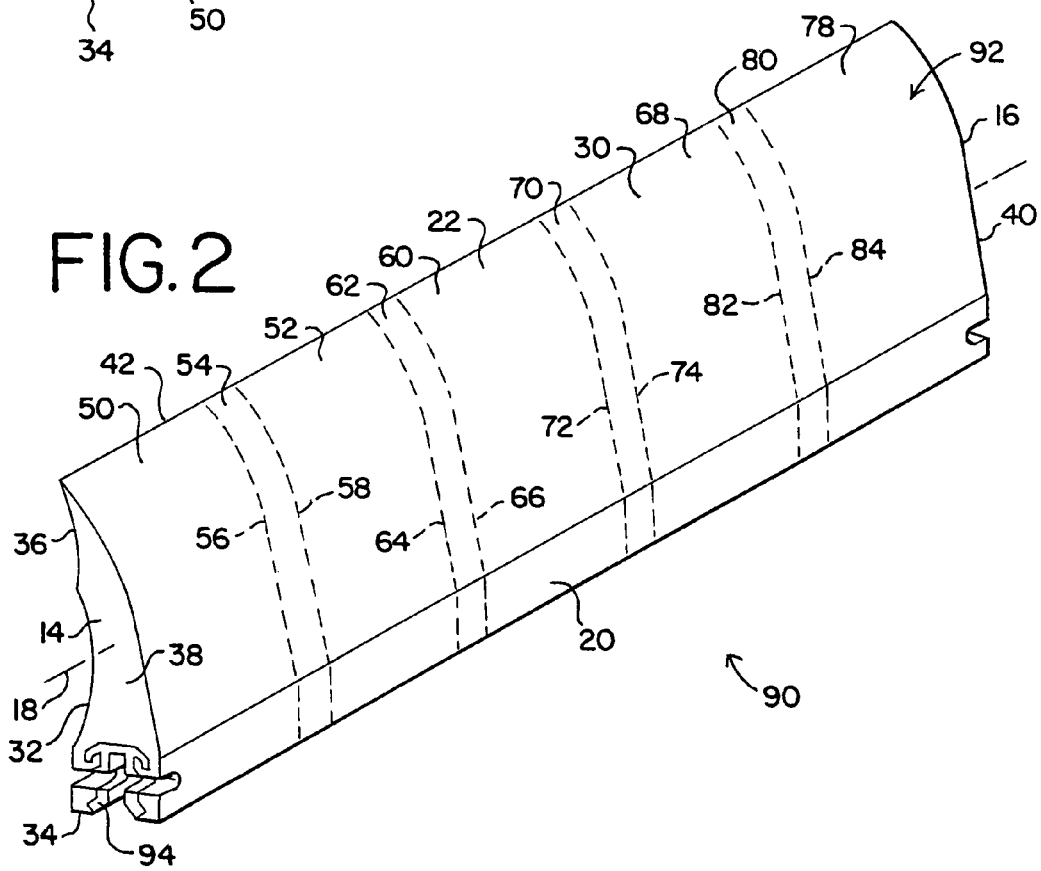

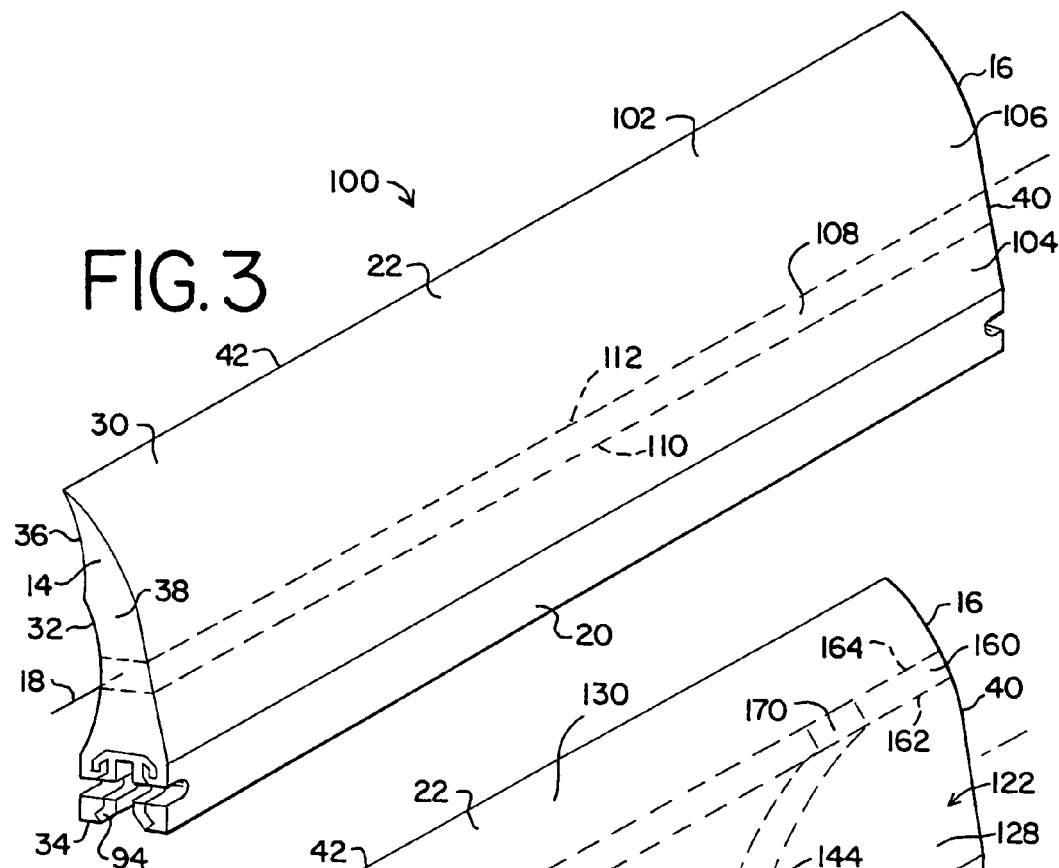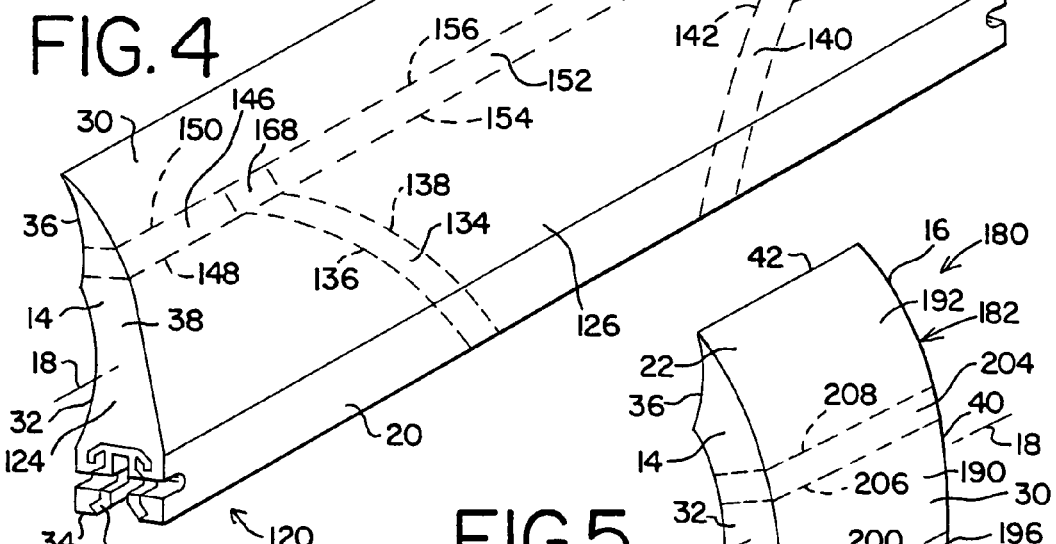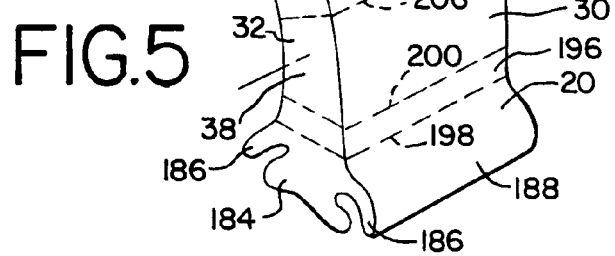

METHOD FOR FORMING A MULTIPLE DUROMETER CONVEYOR BELT CLEANER SCRAPER BLADE

RELATED APPLICATIONS

This application is a continuation-in-part of U.S. application Ser. No. 10/901,652, filed Jul. 29, 2004 now U.S. Pat. No. 7,007,794.

BACKGROUND

The present disclosure is directed to a scraper blade for a conveyor belt cleaner and its method of manufacture, and in particular to a scraper blade having a body including a first body portion comprising a first material having a first durometer, a second body portion comprising a second material having a second durometer, and a transition portion extending between the first body portion and the third body portion comprising a blend of the first material and the second material.

Conveyor belts that carry highly abrasive bulk materials, such as iron-ore, wear faster at the center of the conveyor belt than at the edges of the conveyor belt. This differential in conveyor belt wear is due to a greater loading of the abrasive bulk material at the center of the belt than at the edges of the belt, such that the center of the belt carries a larger portion of the weight of the conveyed bulk material than do the edges of the belt. The scraper blades of a conveyor belt cleaner that are located at the center of the conveyor belt also wear faster than the scraper blades that are located at the edges of the conveyor belt. Fine carry back material often remains adhered to the conveyor belt after the conveyed material has been discharged from the belt. The fine carry back material is more heavily concentrated at the center of the belt than at the edges of the belt. This causes a differential in wear between the scraper blades of the conveyor belt cleaner that are located at the center of the belt and the scraper blades that are located at the edges of the conveyor belt.

The combination of these two conditions, increased loading and a greater amount of carry back material at the center of the belt, causes accelerated wear to the center of the conveyor belt and to the scraper blades of a conventional conveyor belt cleaner that are located at the center of the belt. The differential in the wear of the conveyor belt and in the wear of the scraper blades of a conveyor belt cleaner results in a generally elongate elliptical-shaped cavity being formed between the conveyor belt and the scraper blades at the center of the belt that quickly grows in size and allows unacceptable quantities of carry back material to pass beyond the conveyor belt cleaner.

Conventional conveyor belt cleaner scraper blades are mounted on a cross shaft that is moved either rotationally or linearly to press the scraper blades into scraping engagement with the belt. When a plurality of scraper blades are located adjacent to one another, each blade can be formed from a different respective material, however, this can lead to large abrupt changes in the pressure with which the scraper blades are pressed into engagement with the conveyor belt between adjacent scraper blades.

SUMMARY

A multiple durometer scraper blade for a conveyor belt cleaner and method of manufacture. The scraper blade includes a body extending longitudinally between a first end and a second end and that extends transversely between a base and a tip. The body includes a first body portion comprising a first material having a first durometer, a second body portion comprising a second material having a second durometer, and a transition portion located between the first body portion and the second body portion. The transition portion may comprise a blend of the first material and the second material, or a varied composition material created by varying the composition of the first material to form the second material. The first and second materials each comprise a resilient elastomeric material. The first body portion may be formed substantially free of the second material and the second body portion may be formed substantially free of the first material. The transition portion includes a first end and a second end. The blend of the first material and second material has a first ratio of second material to first material at the first end of the transition portion, and a second ratio of second material to first material at the second end of the transition portion, wherein the second ratio of second material to first material is greater than the first ratio. The scraper blade is formed by pouring molten first material into a mold to form the first body portion of the scraper blade having a first durometer of hardness and thereafter pouring molten second material into the mold to form the second body portion of the scraper blade having a second durometer of hardness. The molten blend of first material and second material may be poured into the mold after the first material is poured to form a transition portion of the scraper blade between the first body portion and the second body portion. Alternatively, a varied composition material may be poured into the mold after the first material is poured to form the transition portion of the scraper blade. The scraper blade is formed and substantially continuously molded as one integral unitary piece. Alternatively, the molten first material may be poured into one or more molds to form the first body portion of one or more scraper blades. Thereafter, before the first material has completely set, the second material is poured into each mold to form the second body portion of each scraper blade.

BRIEF DESCRIPTION OF THE DRAWING FIGURES

FIG. 1 is a perspective view of a scraper blade of the present disclosure.

FIG. 2 shows another embodiment of the scraper blade of the present disclosure.

FIG. 3 shows a further embodiment of the scraper blade of the present disclosure.

FIG. 4 shows another embodiment of the scraper blade of the present disclosure.

FIG. 5 shows yet another embodiment of the scraper blade of the present disclosure.

DETAILED DESCRIPTION

Figure 6:
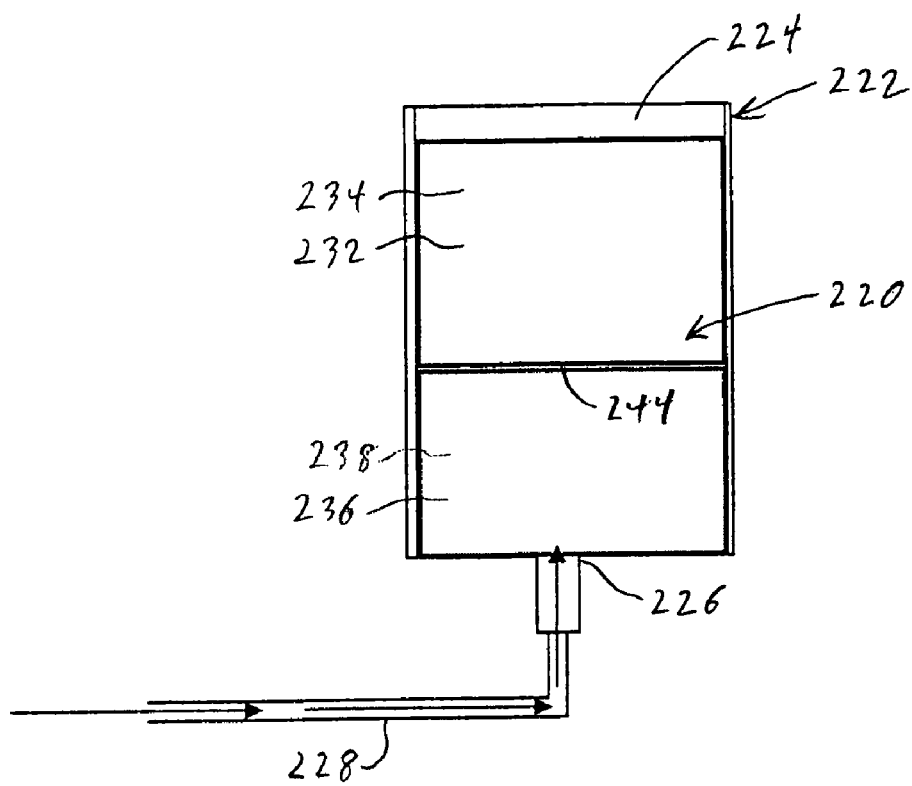
FIG. 6 is a schematic diagram illustrating a method of forming a scraper blade of the present disclosure.

The scraper blade 10, as shown in FIG. 1, is adapted for use in connection with a conveyor belt cleaner and is adapted to be removably mounted to a support member of the conveyor belt cleaner. The scraper blade 10 includes an elongate body 12 that extends longitudinally between a first end 14 and a second end 16. The body 12 includes a generally linear central longitudinal axis 18 that extends from the first end 14 to the second end 16. The body 12 also includes a base 20 and a tip 22. The body 12 extends transversely from the base 20 to the tip 22. The body 12 includes a transverse axis 24 that is generally perpendicular to the longitudinal axis 18. The body 12 has a width that extends between the first end 14 and the second end 16 and a length that extends from the base 20 to the tip 22.

The body 12 includes a front surface 30 and a spaced apart and generally parallel rear surface 32. The body 12 also includes a bottom surface 34 and a spaced apart top surface 36. The bottom surface 34 is located at the base 20 and extends between the front and rear surfaces 30 and 32 and from the first end 14 to the second end 116. The top surface 36 is located at the tip 22 and extends between the front and rear surfaces 30 and 32 and from the first end 14 to the second end 16. The body 12 also includes a first end surface 38 and a second end surface 40. The first end surface 38 is located at the first end 14 of the body 12 and extends between the front and rear surfaces 30 and 32 and between the bottom and top surfaces 34 and 36. The second end surface 40 is located at the second end 16 of the body 12 and extends between the front and rear surfaces 30 and 32 and between the bottom and top surfaces 34 and 36. The first and second end surfaces 38 and 40 are generally planar and are spaced apart and parallel to one another. The tip 22 includes a generally linear scraping edge 42 that extends along the intersection of the front surface 30 and top surface 36. All of the surfaces of the scraper blade 10 as shown in FIG. 1 are generally planar. The body 12 has a thickness that extends between the front surface 30 and the rear surface 32.

The top surface 36 and the scraping edge 42 of the tip 22 are adapted to engage the conveyor belt. The base 20 of the scraper blade 10 is adapted to be removably mounted to the support member of the conveyor belt cleaner. The body 12 is adapted to be positioned with respect to the conveyor belt such that the longitudinal axis 18 is generally transverse to the longitudinal center line of the conveyor belt. The first and second ends 14 and 16 of the body 12 are adapted to be located at respective edges of the conveyor belt.

The body 12 of the scraper blade 10 includes a first body portion 50, a second body portion 52, and a first transition portion 54. The first transition portion 54 is located between the first body portion 50 and second body portion 52. The first body portion 50 comprises a first resilient elastomeric material, such as for example urethane or rubber, having a first durometer of hardness. The first body portion 50 extends from the base 20 to the tip 22 and from the first end 14 of the body 12 to the first transition portion 54. The second body portion 52 comprises a second resilient elastomeric material, such as for example urethane or rubber, having a second durometer of hardness that is different than the first durometer of hardness. The second body portion 52 extends from the base 20 to the tip 22.

The first transition portion 54 extends from the base 20 to the tip 22 and between the first body portion 50 and second body portion 52. The first transition portion 54 includes a first end 56 located adjacent the first body portion 50 and a spaced apart second end 58 located adjacent the second body portion 52. The first transition portion 54 may comprise a blend of the first material and the second material. The blend of the first material and second material has a first ratio of second material to first material at the first end 56 of the first transition portion 54, and a second ratio of second material to first material at the second end 58 of the first transition body portion 54. The second ratio of second material to first material has a greater ratio of second material than the first ratio. The ratio of second material to first material may vary from a majority of first material to second material by weight at the first end 56 to a majority of second material to first material by weight at the second end 58. The ratio of the second material to first material may increase from approximately 0:100 parts by weight of second material to first material at the first end 56 of the first transition portion 54 to approximately 100:0 parts by weight of second material to first material at the second end 58 of the first transition portion 54. The ratio of second material to first material in the first transition portion 54 increases generally uniformly as the first transition portion 54 extends from the first end 56 to the second end 58.

The first transition portion 54 may alternatively comprise a varied composition material created by varying the composition of the first material to form the second material, the varied composition material comprises the material that is formed during the change of the first material into the second material. The composition of the varied composition material changes or varies as the varied composition material extends from the first body portion 50 toward the second body portion 52. The hardness of the first transition portion 54 changes or varies as the first transition portion 54 extends from the first body portion 50 toward the second body portion 52.

The second durometer of the second material may be greater than or smaller than the first durometer of the first material. The first durometer of the first material may be in the range of 50 Shore A to 70 Shore D and the second durometer of the second material may be in the range of 50 Shore A to 70 Shore D, with the first material being either harder or softer than the second material.

The body 12 may include a third body portion 16 and a second transition portion 62 located between the third body portion 60 and the second body portion 52. The second transition portion 62 extends from the base 20 to the tip 22 and includes a first end 64 located adjacent the second body portion 52 and a second end 66 located adjacent the third body portion 60. The third body portion 60 comprises a third resilient elastomeric material, such as urethane or rubber, having a third durometer of hardness. The third durometer of hardness of the third material may be greater or smaller than the durometer of hardness of the first material and/or the second material. The third durometer of the third material may be in the range of approximately 50 Shore A to approximately 70 Shore D. The second transition portion 62 may comprise a blend of the second material and third material, or a varied composition material created by changing the composition of the second material to create the third material. The blend of the second material and third material has a first ratio of third material to second material at the first end 64, and a second ratio of the third material to second material at the second end 66 of the second transition portion 62, wherein the second ratio of third material to second material has a greater ratio of third material than the first ratio. The ratio of third material to second material may vary from a majority of second material to third material by weight at the first end 64 to a majority of third material to second material by weight at the second end 66. The ratio of third material to second material increases generally uniformly from approximately 0:100 parts by weight of third material to second material at the first end 64 to approximately 100:0 parts by weight of third material to second material at the second end 66.

The body 12 may include a fourth body portion 68 that extends from the base 20 to the tip 22 and a third transition portion 70 located between the fourth body portion 68 and the third body portion 60. The third transition portion 70 extends from the base 20 to the tip 22 and includes a first end 72 located adjacent the third body portion 60 and a second end 74 located adjacent the fourth body portion 68. The fourth body portion 68 comprises the second elastomeric material having a second durometer of hardness. The third transition portion 70 may comprise a blend of the third material and second material, or a varied composition material created by varying the composition of the third material to create the second material. The blend has a first ratio of second material to third material at the first end 72, and a second ratio of the second material to third material at the second end 74, wherein the second ratio of second material to third material has a greater ratio of second material than the first ratio. The ratio of second material to third material may vary from a majority of third material to second material at the first end 72 to a majority of second material to third material at the second end 74. The ratio of second material to third material increases generally uniformly from approximately 0:100 parts by weight of second material to third material at the first end 72 to approximately 100:0 parts by weight of second material to third material at the second end 74.

The body 12 may also include a fifth body portion 78 and a fourth transition portion 80 located between the fifth body portion 78 and the fourth body portion 68. The fifth body portion 78 extends from the fourth transition portion 80 to the second end 16 of the body 12. The fifth body portion 78 and fourth transition portion 80 respectively extend from the base 20 to the tip 22. The fourth transition portion 80 includes a first end 82 located adjacent the fourth body portion 68 and a second end 84 located adjacent the fifth body portion 78. The fifth body portion 78 comprises the first elastomeric material having a first durometer of hardness. The fourth transition portion 80 may comprise a blend of the first material and the second material, or a varied composition material. The blend comprising the first material and second material has a first ratio of first material to second material at the first end 82 and a second ratio of first material to second material the second end 84, wherein the second ratio of first material to second material has a greater ratio of first material than the first ratio. The ratio of first material to second material increases generally uniformly from approximately 0:100 parts by weight of first material to second material at the first end 82 to approximately 100:0 parts by weight of first material to second material at the second end 84.

If desired, additional body portions can be included in the body 12 along with an additional transition portion being located between the adjacent body portions. Each additional body portion may be formed from a different material such that each body portion has a respective durometer of hardness. The number of body portions included in the body 12, each having a different durometer of hardness, is unlimited. If desired, the third body portion 60 and the second and third transition portions 62 and 70 can be deleted with the second body portion 52 and fourth body portion 68 being integrally formed with one another. The body 12 of the scraper blade 10 may generally increase in durometer of hardness as the body 12 extends from the first end 14 toward the middle of the body 12, and as it extends from the second end 16 toward the middle of the body 12.

The first and fifth body portions 50 and 78 are formed substantially free from the second and third elastomeric materials. The second and fourth body portions 52 and 68 are formed substantially free from the first and third elastomeric materials. The third body portion 60 is formed substantially free from the first and second elastomeric materials. A cross-section of the body 12 transverse to the axis 18 has a generally uniform hardness as it extends from the base 20 to the tip 22. The ends of the transition portions are shown with dashed lines in FIG. 1 to illustrate the general extent of the transition portions. However, the ends of the transition portions need not be linear and may be curved. The width of each transition portion may vary significantly from a very narrow width to a very wide width. The body 12 of the scraper blade 10 is continuously formed integrally as a single unitary member.

The hardness of the body portions can be varied, from body portion to adjacent body portion, from increasing in hardness to decreasing in hardness, such as for example hard-soft-hard-soft or soft-hard-harder-hardest. The width of each body portion and transition portion can also be varied from portion to portion, such as for example thick-thin-thin-thick. There is no limitation to the patterns or scheme of hardness profiles so long as the chemical behavior and properties of the materials are properly matched to the manufacturing methods and to the desired objective of use for the scraper blade.

FIG. 2 shows another embodiment of the scraper blade identified with the reference number 90. The scraper blade 90 includes a body 92. The body 92 is constructed similar to the body 12 of the scraper blade 10 and similar elements are identified with the same reference number. The body 92 differs from the body 12 in that the front surface 30, rear surface 32 and top surface 36 of the body 92 include curved portions and are not substantially entirely planar as in the body 12. In addition, the body 92 includes a mounting member 94 in the base 20 that extends from the first end 14 to the second end 16. The mounting member 94 includes a slot adapted to receive the support member of the conveyor belt cleaner. The mounting member 94 may be made from a metal material or a rigid non-metal material. The body 92 includes first through fifth body portions and first through third transition portions, that are formed, constructed and operate in the same manner as those in the body 12.

Another embodiment of the scraper blade is shown in FIG. 3 and is identified with the reference number 100. The scraper blade 100 includes a body 102 that has an external configuration that is substantially similar to the body 92 of the scraper blade 90. However, the body 102 is comprised of a plurality of body portions comprising resilient elastomeric materials configured in a different manner than in the body 92. Similar elements are indicated with the same reference number.

The body 102 of the scraper blade 100 includes a first body portion 104, a second body portion 106, and a transition portion 108 located between the first body portion 104 and the second body portion 106. The first body portion 104 extends from the first end 14 to the second end 16 of the body 102, from the front surface 30 to the rear surface 32, and from the base 20 to the transition portion 108. The second body portion 106 extends from the first end 14 to the second end 16 of the body 102, from the front surface 30 to the rear surface 32, and from the transition portion 108 to the tip 22 and scraping edge 42 of the body 102. The transition portion 108 extends from the first end 14 to the second end 16 and between the front and rear surfaces 30 and 32. The transition portion 108 has a first end 110 located adjacent the first body portion 104 and a second end 112 located adjacent the second body portion 106.

The first body portion 104 comprises a first resilient elastomeric material having a first durometer of hardness. The second body portion 106 comprises a second resilient elastomeric material having a second durometer of hardness which may be harder or softer than the first durometer of hardness of the first elastomeric material. The transition portion 108 may comprise a blend of the first material and second material, or a varied composition material created by varying the composition of the first material to create the second material. The blend of first material and second material has a first ratio of second material to first material at the first end 110 of the transition portion 108, and a second ratio of second material to first material at the second end 112 of the transition portion 108, wherein the second ratio of second material to first material has a greater ratio of second material than the first ratio. The ratio of second material to first material may vary from a majority of first material to second material at the first end 110 to a majority of second material to first material at the second end 112. The ratio of second material to first material may increase generally uniformly from approximately 0:100 parts by weight of second material to first material at the first end 110 to approximately 100:0 parts by weight of second material to first material at the second end 112.

The durometer of hardness of the body 102 may increase as the body 102 extends from the base 20 to the scraping edge 42. The transitioning of the first material to the second material between the first body portion 104 and second body portion 106 within the transition portion 108 changes the flexibility of the body 102 between the base 20 and the tip 22 along the height of the body 102 without the transition portion 108 simply acting as a hinge about which the tip 22 pivots.

A further embodiment of the scraper blade is shown in FIG. 4 and is identified with the reference number 120. The scraper blade 120 includes a body 122 that is externally configured in the same general manner as the bodies 92 and 102 of the scraper blades 90 and 100. Similar elements are identified with the same reference numbers. The body 122 includes a first body portion 124, a second body portion 126, a third body portion 128, and fourth body portion 130. The first, second and third body portions 124, 126 and 128 are located along the longitudinal axis 18 between the first end 14 and second 16 of the body 122 and extend upwardly from the base 20 toward the tip 22 and scraping edge 42 between the front surface 30 and rear surface 32. The second body portion 126 is located between the first body portion 124 and third body portion 128.

The body 122 includes a first transition portion 134 located between the first body portion 124 and second body portion 126. The first transition portion 134 includes a first end 136 located adjacent the first body portion 124 and a second end 138 located adjacent the second body portion 126. The body 122 includes a second transition portion 140 located between the second body portion 126 and the third body portion 128. The second transition portion 140 includes a first end 142 located adjacent the second body portion 126 and a second end 144 located adjacent the third body portion 128.

The body 122 includes a third transition portion 146 located between the first body portion 124 and the fourth body portion 130. The third transition portion 146 includes a first end 148 located adjacent the first body portion 124 and a second end 150 located adjacent the fourth body portion 130. The body 122 also includes a fourth transition portion 152 located between the second body portion 126 and fourth body portion 130. The fourth transition portion 152 includes a first end 154 located adjacent the second body portion 126 and a second end 156 located adjacent the fourth body portion 130. The body 122 also includes a fifth transition portion 160 located between the third body portion 128 and the fourth body portion 130. The fifth transition portion 160 includes a first end 162 located adjacent the third body portion 128 and a second end 164 located adjacent the fourth body portion 130. The fourth body portion 130 extends from the first end 14 to the second end 16 of the body 12 and extends from the third, fourth and fifth transition portions 146, 152 and 160 to the tip 22 and scraping edge 42.

As shown in FIG. 4, the bottom end of the first body portion 124 and third body portion 128 are each wider than the top end of the body portions 124 and 128 that are located respectively adjacent the third and fifth transition portions 146 and 160. The bottom end of the second body portion 126 at the base 20 is narrower than the width of the top end of the second body portion 126 adjacent the fourth transition portion 152.

The body 122 includes a sixth transition portion 168 located between the first, second and fourth body portions 124, 126 and 130. The body 120 also includes a seventh transition portion 170 located between the second, third and fourth body portions 126, 128 and 130.

The first and third body portions 124 and 128 are formed from a first resilient elastomeric material having a first durometer of hardness. The second body portion 126 is formed from a second resilient elastomeric material having a second durometer of hardness that may be harder or softer than the durometer of the first material. The fourth body portion 130 is formed from a third resilient elastomeric material having a third durometer of hardness that may be harder or softer than the durometer of the second material.

The first transition portion 134 may comprise a blend of the first elastomeric material and second elastomeric material, or a varied composition material as described above. The second transition portion may 140 comprise a blend of the first elastomeric material and second elastomeric material, or a varied composition material. The third transition portion 146 may comprise a blend of the first elastomeric material and the third elastomeric material, or a varied composition material. The fourth transition portion 152 may comprise a blend of the second elastomeric material and third elastomeric material, or a varied composition material. The fifth transition portion 160 may comprise a blend of the first elastomeric material and third elastomeric material, or a varied composition material. The ratio of the elastomeric materials that comprise each blend varies across the width of the transition portions as described in the prior embodiments. The sixth and seventh transition portions 168 and 170 may each comprise a blend of the first, second and third elastomeric materials, or a varied composition material.

The second body portion 126 comprising the second elastomeric material may provide a greater biasing force for resiliently biasing the scraping edge 42 into engagement with the center of the conveyor belt than do the adjacent first and third body portions 124 and 128 which resiliently bias the scraping edge 42 into engagement with the side edges of the conveyor belt. Alternately, the first body portion 124 and the third body portion 128 may provide a greater biasing force for resiliently biasing the scraping edge 42 into engagement with the side edges of the conveyor belt than the second body portion 126 resiliently biases the scraping edge 42 into engagement with the center of the conveyor belt. The fourth body portion 130 that is adapted to engage the conveyor belt is formed from the third elastomeric material having the third durometer of hardness such that the third body portion 128 may be more wear resistant than the body portions 124, 126 and 128. In general, as the durometer of hardness of an elastomeric material increases, the material is harder, and the biasing force the material can provide increases and the wear resistance of the material also increases.

FIG. 5 shows a further embodiment of the scraper blade identified with the reference number 180. The scraper blade 180 includes a body 182 having an external configuration substantially similar to the body 102 of the scraper blade 100. Similar elements are indicated with the same reference number. The body 182 includes a generally T-shaped mounting member 184 and a pair of flaps 186 located on opposite sides of the mounting member 184. The body 182 includes a first body portion 188, a second body portion 190 and a third body portion 192. The first body portion 188 comprises a first resilient elastomeric material having a first durometer of hardness. The second body portion 190 comprises a second resilient elastomeric material having a second durometer of hardness that may be harder or softer than the first durometer of hardness of the first elastomeric material. The third body portion 192 comprises a third resilient elastomeric material having a third durometer of hardness that may be harder or softer than the second durometer of hardness of the second elastomeric material.

The body 182 includes a first transition portion 196 located between the first body portion 188 and the second body portion 190. The first transition portion 196 includes a first end 198 located adjacent the first body portion 198 and a second end 200 located adjacent the second body portion 190. The first transition portion 196 may comprise a blend of the first material having a first durometer and the second material having a second durometer, or a varied composition material. The blend comprising the first material and second material has a first ratio of second material to first material at the first end 198 of the first transition portion 196, and a second ratio of second material to first material at the second end 200 of the first transition portion 196, wherein the second ratio of second material to first material has a greater ratio of second material than the first ratio. The ratio of second material to first material may vary from a majority of first material to second material by weight of the first end 198 to a majority of second material to first material by weight at the second end 200. The ratio of the second material to first material increases generally uniformly from approximately 0:100 parts by weight of second material to first material at the first end 198 of the first transition portion 196 to approximately 100:0 parts by weight of second material to first material at the second end 200 of the first transition portion 196.

The body 182 also includes a second transition portion 204 located between the second body portion 190 and the third body portion 192. The second transition portion 204 may comprise a blend of the second material having the second durometer of hardness and the third material having the third durometer of hardness, or a varied composition material. The blend comprising the second material and the third material has a first ratio of third material to second material at the first end 206 of the second transition portion 204, and a second ratio of third material to second material at the second end 208 of the second transition portion 204, wherein the second ratio of the second material to first material has a greater ratio of third material than the first ratio. The ratio of the third material to second material may vary from a majority of second material to third material by weight at the first end 206 to a majority of third material to second material by weight of the second end 208. The ratio of the third material to the second material increases generally uniformly from approximately 0:100 parts by weight of third material to second material at the first end 206 to approximately 100:0 parts by weight of third material to second material at the second end 208.

Each of the body portions 188, 190 and 192, and each of the transition portions 196 and 204, extend the width and thickness of the body 182 from the first end 14 to the second end 16 and from the front surface 30 to the rear surface 32. The hardness of the body 182 increases along its height from the base 20 to the tip 22 and scraping edge 42. The flexibility of the body 182 about an axis parallel to the longitudinal axis 18 may increase as the body 182 extends from the tip 22 and scraping edge 42 toward the base 20. The body 182 is formed integrally as one unitary piece.

The scraper blades 10, 90, 100, 120 and 180 are all multi-durometer scraper blades that are continuously formed and molded from two or more different elastomeric materials having respectively different durometers of hardness. The scraper blades may be molded within a mold of a multi-head casting machine, or of a computer controlled single-head casting machine, capable of automatically ramping up or down chemical component ratios or types of materials. A molten first elastomeric material is initially poured or injected into the mold to form the first body portion comprising the first material and having a first durometer of hardness. After the desired amount of first material has been poured into the mold to form the first body portion in the desired configuration, molten second elastomeric material having a second durometer of hardness may be combined with the molten first material to form a blend comprising the first and second materials that is poured into the mold. The amount of the second material being combined with the first material in the blend that is being poured into the mold increases generally uniformly, and the amount of the first material in the blend is generally uniformly decreased, while the transition portion of the body is formed. Molten elastomeric material comprising the second material, substantially without any first material, is then poured into the mold to form a second body portion in the desired size and configuration.

This pour process can be continued with additional types of elastomeric materials to form additional body portions, with each body portion having a desired durometer of hardness. Two or more different elastomeric materials having different durometers of hardness may be combined to form a portion of the body of the scraper blade. Each scraper blade is formed from a substantially continuous pour of molten elastomeric material such that the body of the scraper blade is formed as an integral single unitary piece. Various configurations and patterns of body portions, and boundaries of the body portions can be created as desired. In addition the ratio of the different elastomeric materials that are being poured at one time, the curatives and other additives that may be added to the elastomeric materials, and other molding parameters can be changed and continuously adjusted during the pour.

Changing the hardness of the material during casting can be achieved by varying the composition of the casting material and by varying the manufacturing controls, such as gel times and process temperatures. In a five stream casting machine, four streams can be blended to provide a 55 Shore A to a 60 Shore D elastomeric material. Changing one of these four streams can provide a different elastomeric material with a durometer in the range of 70 Shore A to 70 Shore D. All five of the streams may be programmable in terms of relative ratios of materials and ramp up and ramp down rates, such that many different compositions of elastomeric materials may be formed each having different properties and hardnesses.

The scraper blades may also be substantially continuously and integrally formed by initially pouring a molten first elastomeric material having a first durometer of hardness into a mold to form a first body portion having a first durometer of hardness. After the first body portion is formed, the composition of the first material may be varied to form a second elastomeric material having a second durometer of hardness. As the composition of the first material is changed a varied composition material is formed until the composition of the second material is formed. The varied composition material is poured into the mold as the composition of the varied composition material is varied to form a transition portion of the blade. Once the composition of the varied composition material has been changed to form the second material, the molten second material is poured into the mold to form a second body portion having a second durometer of hardness.

As generally illustrated in FIG. 6, a multiple durometer scraper blade 220 may be formed or molded within a bottom pour mold 222. The mold 222 includes a hollow chamber 224 and an inlet 226 located at the bottom end of the mold 222 that is in fluid communication with the chamber 224. The inlet 226 is in fluid communication with a source of molten material, such as a casting machine, through a hose or conduit 228 that is connected between the inlet 226 and the source of molten material. A molten first elastomeric material 232 is initially poured into the mold 222 through the conduit 228 to form a first body portion 234 of the body of the scraper blade 220 having a first durometer of hardness. After the desired amount of the first elastomeric material 232 has been poured into the mold 222 to form the first body portion 234 in a desired configuration, a molten second elastomeric material is poured into the mold 222 through the conduit 228 to form a second body portion 238 of the body of the scraper blade 220 having a second durometer of hardness. After the first elastomeric material 232 that forms the first body portion 234 has been poured into the mold 222, the first and second elastomeric materials 232 and 236 may be combined to form a blend that is poured into the mold 222 to form a transition portion 242 of the body of the scraper blade 220, whereafter only second elastomeric material 236 is poured into the mold 222. The transition portion 244 is thereby located between the first body portion 234 and the second body portion 238. Alternatively, after the first elastomeric material 232 has been poured into the mold 222 for forming the first body portion 234, the material to be poured into the mold can be switched to the second elastomeric material 236. The second elastomeric material is then poured into the mold through the inlet 226 to form the second body portion 238. A relatively thin transition portion is formed between the first body portion 234 and second body portion 238 wherein the first and second elastomeric materials 234 and 236 have mixed with one another within the mold 222. The scraper blade 220 is substantially continuously and integrally formed and molded as a single unitary member in a substantially continuous molding process. As used herein, references to pouring material into a mold are intended to include injection or pumping of material into a mold, and any other methods by which material is cast within a mold.

Figure 7:
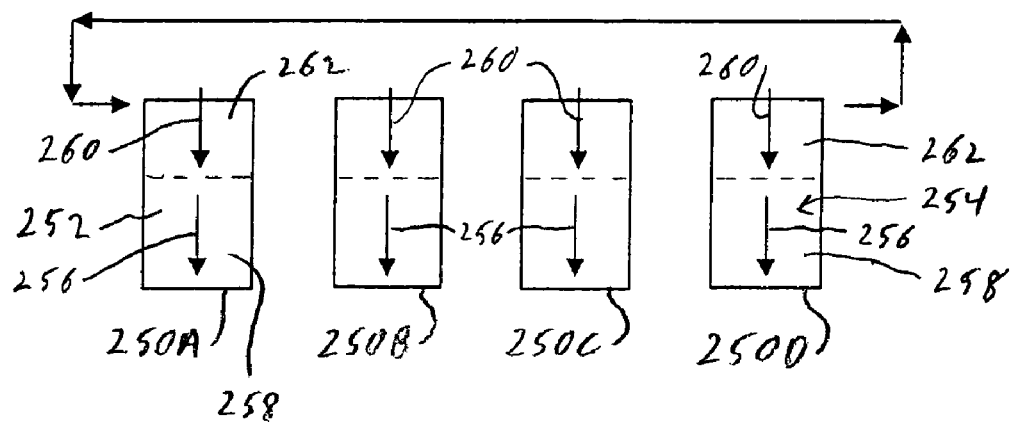
FIG. 7 is a schematic diagram illustrating another method of forming a scraper blade of the present invention.

As generally illustrated in FIG. 7, one or more molds 250A-D may be located adjacent to one another. Each mold 250A-D includes a hollow chamber 252. A multiple durometer scraper blade 254 having a body is formed respectively within each mold 250A-D. Initially a first elastomeric material 256 is poured into the mold 250A, and then poured sequentially into each of the molds 250B, 250C and 250D. The first elastomeric material 256 forms a first body portion 258 of the body of the scraper blade 254. The first elastomeric material 256 and the first body portion 258 have a first durometer of hardness. Thereafter, a second elastomeric material 260 is poured sequentially to each of the molds 250A-250D thereby forming a second body portion 262 of the body of each scraper blade 254 within a respective mold 250A-D. The second elastomeric material 260 and the second body portion 262 have a second durometer of hardness. After the first elastomeric material 256 has been poured into each of the molds 250A-D, the first elastomeric material 256 may be allowed to set for a desired period of time such that it becomes partially gelled before the second elastomeric material 260 is poured into the molds 250A-D. A thin transition portion of the body of the scraper blade 254 is formed between the first and second body portions 258 and 262 when the second elastomeric material 260 is poured into the molds 250A-D. The second elastomeric material 260 meshes with the first elastomeric material 256 such that the scraper blade 254 is formed and molded as a single integral unitary member. This method of forming a scraper blade 254 may be used in connection with a single mold 250A or with a plurality of such molds.

The multi-durometer scraper blades provide the ability to control the flexibility of the scraper blade, the conformity of the scraper blade to the configuration of the conveyor belt, and the force and pressure with which the scraper blade engages the surface of the conveyor belt along the width of the blade. The scraper blades 10 and 90 as shown in FIGS. 1 and 2 provide the ability to vary both the hardness of the blade across the width of the scraper blade and the ability to control the engagement pressure distribution of the scraper blade with the conveyor belt. The use of harder internal material and softer outer material will provide a downwardly concave pressure profile on the conveyor belt. Alternatively, the use of softer internal material and harder outer material will provide an upwardly concave pressure profile on the conveyor belt. The scraper blade 120 as shown in FIG. 4 may include a hard cleaning tip that is relatively wear-resistant. The blade 120 may include a relatively hard internal material and a softer external material in the base that provide a downwardly concave pressure profile when the blade is engaged with the conveyor belt, or relatively soft internal material and harder external material in the base that provide an upwardly concave pressure profile when the blade is engaged with the belt.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A method of forming a scraper blade for a conveyor belt cleaner, said method comprising the steps of:
    pouring a molten first material into a mold to form a first body portion of the scraper blade having a first durometer of hardness;
    pouring a molten second material into the mold to form a second body portion of the scraper blade having a second durometer of hardness;
    whereby said first body portion and said second body portion are molded as portions of a single unitary member in a substantially continuous molding process.

2. The method of claim 1 wherein said first material comprises an elastomeric material and said second material comprises an elastomeric material.

3. The method of claim 1 including the step of pouring a molten blend of said first material and said second material into the mold to form a transition portion of said scraper blade, said transition portion being located between said first body portion and said second body portion.

4. The method of claim 3 including the step of adjusting the ratio of said second material to said first material in said blend as said blend is poured into the mold.

5. The method of claim 1 including the step of creating a varied composition material, after the molten first material has been poured, by changing the composition of the first material to the composition of the second material, and pouring the varied composition material into the mold as the composition of the first material is changed to the composition of the second material, the varied composition material forming a transition portion of the scraper blade between said first body portion and said second body portion.

6. The method of claim 1 wherein said mold is a bottom pour mold.

7. A method of forming a scraper blade for a conveyor belt cleaner, said method comprising the steps of:
    pouring a molten first material into a mold to form a first body portion of the scraper blade having a first durometer of hardness;

pouring a molten blend of said first material and a second material into the mold to form a transition portion of the scraper blade; and pouring molten second material into the mold to form a second body portion of the scraper blade having a second durometer of hardness;

whereby said first body portion, said transition portion, and said second body portion are formed as portions of a single unitary member.

8. The method of claim 7 including the step of adjusting the ratio of said second material to said first material in said blend as said blend is poured into the mold.

9. The method of claim 7 wherein said first material comprises an elastomeric material and said second material comprises an elastomeric material.

10. The method of claim 7 wherein said first body portion, said transition portion, and said second body portion are molded in a substantially continuous molding process.

11. A method of forming a scraper blade for a conveyor belt cleaner, said method comprising the steps of:

pouring a molten first material into a mold to form a first body portion of the scraper blade having a first durometer of hardness;

creating a varied composition material by changing the composition of the first material to a second material;

pouring the varied composition material into the mold as the composition of the first material is changed to the composition of the second material, the varied composition material forming a transition portion of the scraper blade;

pouring molten second material into the mold to form a second body portion of the scraper blade having a second durometer of hardness;

whereby said first body portion, said transition portion, and said second body portion are formed as portions of a single unitary member.

12. The method of claim 11 wherein said first material comprises an elastomeric material and said second material comprises an elastomeric material.

13. The method of claim 11 wherein said first body portion, said transition portion, and said second body portion are molded in a substantially continuous molding process.

14. A method of forming one or more scraper blades for a conveyor belt cleaner, said method comprising the steps of:

pouring a molten first material into a first mold to form a first body portion of a first scraper blade, the first body portion having a first durometer of hardness;

waiting a selected period of time after the molten first material is poured into the first mold;

pouring a molten second material into the first mold after waiting the selected period of time after the molten first material is poured into the first mold to form a second body portion of the first scraper blade, the second body portion having a second durometer of hardness;

whereby said first body portion and said second body portion are formed as portions of a single unitary member.

15. The method of claim 14 wherein said first material comprises an elastomeric material and said second material comprises an elastomeric material.

16. The method of claim 14 including the steps of pouring molten first material into a second mold to form a first body portion of a second scraper blade after molten first material has been poured into the first mold and before molten second material is poured into the first mold, and pouring molten second material into the second mold to form a second body portion of the second scraper blade after molten second material is poured into the first mold.

\* \* \* \* \*